United States Patent
Yasui et al.

(10) Patent No.: US 8,881,489 B2
(45) Date of Patent: Nov. 11, 2014

(54) LIGHT CONTROL PROCESS, LIGHT CONTROL SYSTEM AND BUILDING

(75) Inventors: Ichirou Yasui, Chiyoda-ku (JP); Koichi Oda, Chiyoda-ku (JP)

(73) Assignee: AGC Green-Tech Co., Ltd., Tokyo (JP)

( * ) Notice: Subject to any disclaimer, the term of this patent is extended or adjusted under 35 U.S.C. 154(b) by 310 days.

(21) Appl. No.: 13/074,068

(22) Filed: Mar. 29, 2011

(65) Prior Publication Data

US 2011/0173903 A1    Jul. 21, 2011

Related U.S. Application Data

(63) Continuation of application No. PCT/JP2009/067776, filed on Oct. 14, 2009.

(30) Foreign Application Priority Data

Oct. 14, 2008  (JP) .................................. 2008-264753

(51) Int. Cl.
*E04B 1/00*     (2006.01)
*E06B 7/00*     (2006.01)
(Continued)

(52) U.S. Cl.
CPC ................. *F21V 14/06* (2013.01); *G02B 26/02* (2013.01); *A01G 9/225* (2013.01); *A01G 9/1415* (2013.01); *F21S 11/00* (2013.01)
USPC ............................ 52/741.1; 52/2.22; 52/171.3

(58) Field of Classification Search
CPC ....... E06B 3/67; E06B 3/6715; E06B 3/6722; E06B 3/677; E06B 2009/2411; E06B 7/00; F21S 10/00; F21S 10/002; F21S 11/00; F21V 14/00; F21V 14/006; F21V 14/06; A01G 9/14; A01G 9/1407; A01G 9/1415; A01G 9/1469; A01G 9/20; A01G 9/225; A01G 9/245
USPC ......... 52/2.22, 90.1, 171.3, 172, 204.52, 209, 52/222, 741.1; 359/591, 227, 228; 362/145, 147, 149, 317, 318, 319, 320, 362/351, 352
See application file for complete search history.

(56) References Cited

U.S. PATENT DOCUMENTS 3,470,049 A * 9/1969 Reusch .......................... 156/145
4,044,519 A * 8/1977 Morin et al. ................ 52/204.59
(Continued)

FOREIGN PATENT DOCUMENTS

JP      61-146992      7/1986
JP      62-4517        1/1987
(Continued)

OTHER PUBLICATIONS

Definition of Vapor, http://www.thefreedictionary.com/vapor (last visited Feb. 14, 2012).*

(Continued)

*Primary Examiner* — Joshua J Michener
*Assistant Examiner* — Theodore Adamos
(74) *Attorney, Agent, or Firm* — Oblon, Spivak, McClelland, Maier & Neustadt, L.L.P.

(57) ABSTRACT

A light control process, a light control system and a building, which are capable of increasing, in a short period of time, the amount of light passing through a multiple sheet including a plurality of transparent sheet layers are provided.
A light control process including steps of (a) supplying moisture in between the transparent sheet layers 12 of the multiple sheet 10, and (b) reducing the pressure between the transparent sheet layers 12 of the multiple sheet 10 to bring the transparent sheet layers 12 into close contact with each other with the moisture existing between the transparent sheet layers 12, whereby the amount of light passing through the multiple sheet 10 is reduced in comparison with the amount of light passing through the multiple sheet before supplying the moisture in between the transparent sheet layers 12; A light control system including a multiple sheet 10, a moisture supply system for supplying moisture in between the transparent sheet layers 12 of the multiple sheet 10, and a pressure-reducing system for reducing the pressure between the transparent sheet layers 12 of the multiple sheet 10; and A building including the light control system according to the present invention, the building having a roof and/or walls at least partly formed of a multiple sheet 10.

7 Claims, 4 Drawing Sheets

(51) Int. Cl.
*F21V 14/06* (2006.01)
*A01G 9/22* (2006.01)
*A01G 9/14* (2006.01)
*F21S 11/00* (2006.01)
*G02B 26/02* (2006.01)

(56) References Cited

U.S. PATENT DOCUMENTS

| | | | | |
|---|---|---|---|---|
| 4,093,352 | A | * | 6/1978 | Pisar ............................. 359/886 |
| 4,773,190 | A | * | 9/1988 | Reade ............................ 52/2.18 |
| 6,427,394 | B1 | * | 8/2002 | Clodic ........................... 52/171.3 |
| 2007/0277451 | A1 | * | 12/2007 | Yasui ............................ 52/171.3 |

FOREIGN PATENT DOCUMENTS

| | | |
|---|---|---|
| JP | 1-90922 | 6/1989 |
| JP | 4-12832 | 1/1992 |
| JP | 7-21814 | 1/1995 |
| JP | 8-196152 | 8/1996 |
| JP | 2007-319138 | 12/2007 |

OTHER PUBLICATIONS

International Search Report mailed Dec. 15, 2009 in PCT/JP2009/067776 filed Oct. 14, 2009.

* cited by examiner

LIGHT CONTROL PROCESS, LIGHT CONTROL SYSTEM AND BUILDING

TECHNICAL FIELD

The present invention relates to a light control process, a light control system and a building.

BACKGROUND ART

Examples of buildings, which have a roof or walls formed of a transparent sheet or a transparent film, include houses for cultivating plants, barns, fish farming facilities, and sporting facilities. In such buildings, it is required to control the amount of light entering such buildings for various reasons. For example, some houses for cultivating plants are configured to allow as much light as possible to enter therein in the morning where plants actively photosynthesize while preventing an excessive amount of light from entering therein in the afternoon in order to reduce a temperature rise therein or the stress to plants.

As panels and buildings, which can control the amount of light entering buildings, the following proposals have been made:

1. A panel including two opposed transparent films, a frame holding these films in an airtight manner, and a vacuum pump and an air pump connected to the space surrounded by these films and the frame (see Patent Document 1)

2. A building having a roof and walls formed by a multiple sheet of a plurality of transparent sheet layers, and including a vapor supply system for supplying vapor in between opposed transparent sheet layers of the multiple sheet (see Patent Document 2)

In the panel mentioned in item 1, the vacuum pump reduces the pressure in the space between the two opposed transparent films to bring the two opposed transparent films into close contact with each other in order to increase the amount of light passing through the two opposed transparent films. However, the verification test conducted by the inventors of the present invention revealed that there was almost no change in the amount of light transmission between before and after bringing the two opposed transparent films into close contact with each other.

In the building mentioned in item 2, vapor is supplied in between the opposed transparent sheet layers of the multiple sheet to generate dew condensation on the opposed surfaces of the opposed transparent sheet layers in order to decrease the amount of light passing through the multiple sheet. However, even if an attempt is made to return the amount of light passing through the multiple sheet to the level that was obtained before supplying the vapor in between the opposed transparent sheet layers, it is impossible to successfully carry out the attempt in a short period of time since it is not easy to remove the dew condensation generated on the opposed surfaces of the opposed transparent sheet layers. Further, it is impossible to increase the amount of light passing through the multiple sheet to at least the level that was obtained before supplying the vapor in between the opposed transparent sheet layers.

PRIOR ART DOCUMENTS

Patent Document(s)

Patent Document 1: U.S. Pat. No. 4,773,190
Patent Document 2: JP-A-2007-319138

DISCLOSURE OF INVENTION

Technical Problem

It is an object of the present invention to provide a light control process, a light control system and a building with such a light control system, which are capable of increasing, in a short period of time, the amount of light passing through a multiple sheet including a plurality of transparent sheet layers.

It is another object of the present invention to provide a light control process, a light control system and a building with such a light control system, which are capable of decreasing the amount of light passing through a multiple sheet of a plurality of transparent sheet layers, followed by increasing, in a short period of time, the amount of light passing through the multiple sheet to at least level that was obtained before decreasing the amount of light.

Solution to Problem

The light control process according to the present invention is a light control process for controlling the amount of light passing through a multiple sheet including a plurality of opposed transparent sheet layers and is characterized to include steps of (a) supplying moisture in between the transparent sheet layers of the multiple sheet; and (b) after conducting the step (a), reducing the pressure between the transparent sheet layers of the multiple sheet to bring the transparent sheet layers into close contact with each other with the moisture existing between the transparent sheet layers.

In the light control process according to the present invention, it is preferred that the step (a) further include supplying vapor and/or a mist in between the transparent sheet layers of the multiple sheet to generate dew condensation on the opposed surfaces of the transparent sheet layers (step (a1)) and that the step (b) further include, after conducting the step (a1), reducing the pressure between the transparent sheet layers of the multiple sheet to bring the transparent sheet layers into close contact with each other with vapor and/or mist-deriving moisture existing between the transparent sheet layers (step (b1)).

In the light control process according to the present invention, it is preferred that the amount of light passing through the multiple sheet be controlled in a building, which has a roof and/or walls at least partly formed of the multiple sheet.

It is preferred that each of the transparent sheet layers be composed of a material made of a fluororesin, a polyvinyl chloride resin, polyester, polyethylene, an ethylene/vinyl acetate copolymer (hereinbelow, abbreviated as EVA), polyethylene terephthalate, an acrylic resin, or polycarbonate.

It is preferred that the fluororesin be made of an ethylene/tetrafluoroethylene copolymer (hereinbelow, abbreviated as ETFE), a hexafluoropropylene/tetrafluoroethylene copolymer (hereinbelow, abbreviated as FEP), a perfluoro(alkyl vinyl ether)/tetrafluoroethylene copolymer, a tetrafluoroethylene/hexafluoropropylene/vinylidene fluoride copolymer (hereinbelow, abbreviated as THV), polyvinylidene fluoride, a vinylidene fluoride/hexafluoropropylene copolymer, or polyvinyl fluoride.

It is preferred that each of the transparent sheet layers have a total light transmittance of at least 80%.

The light control system according to the present invention is a light control system for controlling the amount of light passing through a multiple sheet including a plurality of opposed transparent sheet layers and is characterized to include the multiple sheet, a moisture supply system for supplying moisture in between the transparent sheet layers of the multiple sheet, and a pressure-reducing system for reducing the pressure between the transparent sheet layers of the multiple sheet.

It is preferred that the moisture supply system be a vapor supply system for supplying vapor, or a mist supply system for supplying a mist.

It is preferred that the material for the transparent sheet layers and the fluororesin employed in the light control system according to the present invention be the same as those employed in the light control process according to the present invention. It is also preferred that the transparent sheet layers in the light control system have a total light transmittance set at the same value as that in the light control process.

The building according to the present invention is a building including the light control system according to the present invention and is characterized to have a roof and/or walls at least partly formed of the above-mentioned multiple sheet.

Advantageous Effect(s) of Invention

In accordance with the light control process of the present invention, it is possible to increase, in a short period of time, the amount of light passing through such a multiple sheet formed of a plurality of transparent sheet layers.

When the light control process according to the present invention is configured such that vapor and/or mist is supplied in between opposed transparent sheet layers of such a multiple sheet, it is possible to decrease the amount of light passing through such a multiple sheet, followed by increasing, in a short period of time, the amount of light passing through such a multiple sheet to at least the level that was obtained before decreasing the amount of light.

In accordance with the light control system of the present invention, it is possible to increase, in a short period of time, the amount of light passing through such a multiple sheet formed of a plurality of transparent sheet layers.

When the light control system according to the present invention is configured such that a moisture supply system for supplying moisture in between opposed transparent sheet layers of such a multiple sheet is a vapor and/or mist supply system, it is possible to decrease the amount of light passing through such a multiple sheet, followed by increasing, in a short period of time, the amount of light passing through such a multiple sheet to at least the level that was obtained before decreasing the amount of light.

In accordance with the building of the present invention, it is possible to increase, in a short period of time, the amount of light entering the building.

When the building according to the present invention is configured such that a moisture supply system for supplying moisture in between opposed transparent sheet layers of such a multiple sheet is a vapor and/or mist supply system, it is possible to decrease the amount of light entering the building, followed by increasing, in a short period of time, the amount of light entering the building to at least the level that was obtained before decreasing the amount of light.

Thus, the light control process, the light control system and the building with the light control system, to which the present invention is applied, are effective to buildings, which have a roof or walls formed of transparent sheet layers or transparent films, such as houses for cultivating plants.

BRIEF DESCRIPTION OF DRAWING(S)

DESCRIPTION OF EMBODIMENT(S)

The wording "sheet" referred to in Description includes a relatively thin "film" as well.

The wording "opposed" referred to in Description means that as seen from a direction orthogonal to the surfaces of transparent sheet layers, the respective transparent sheet layers are disposed so as to overlap with the opposed surfaces of the transparent sheet layers failing to be partly or entirely brought into close contact with each other. It is sufficient that the transparent sheet layers can form a space therebetween when a gas (such as air) is supplied. It is not necessary for the transparent sheet layers to form a visible space therebetween.

The phrase "a roof and/or walls at least partly formed" referred to in Description contains a case where a window is formed in the roof or a wall.

Light Control System

Figure 1:
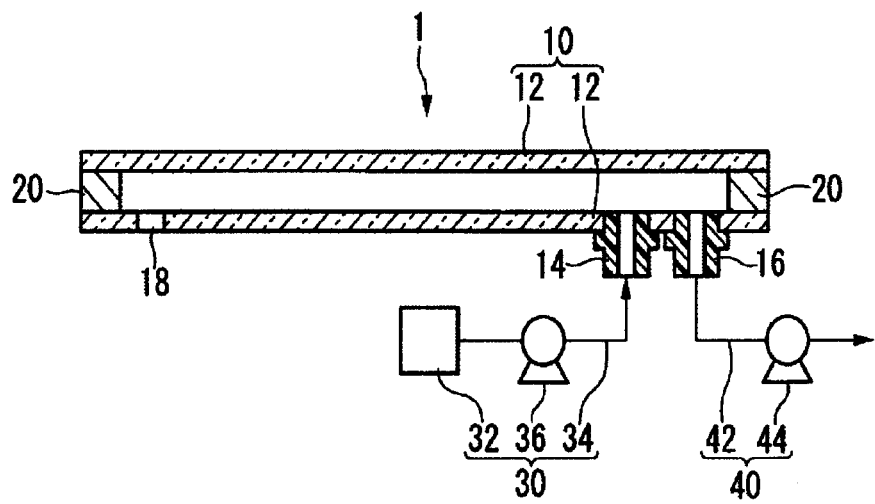
FIG. 1 is a cross-sectional view showing the light control system according to an embodiment of the present invention.

FIG. 1 is a cross-sectional view showing the light control system according to a embodiment of the present invention. The light control system 1 includes two opposed transparent sheet layers 12 disposed and form a multiple sheet 10; a gas supply port 14, a first discharge port 16 and a second discharge port 18 formed in one of the transparent sheet layers 12; a frame 20 for airtightly holding peripheral edge portions of the two transparent sheet layers 12; a vapor supply system 30 (moisture supply system) for supplying vapor in between the transparent sheet layers 12 of the multiple sheet 10; and a pressure-reducing system 40 for reducing the pressure between the transparent sheet layers 12 of the multiple sheet 10.

The vapor supply system 30 includes a vapor generator 32, a gas supply path 34 connecting between the vapor generator 32 and the gas supply port 14 of the multiple sheet 10, and a blower 36 disposed in the gas supply path 34. Examples of the vapor generator includes a combination of a heater (such as an electric heater) and a water bath, and a commercially available humidifier.

The pressure-reducing system 40 includes a discharge path 42 having one end connected to the first discharge port 16 of the multiple sheet 10, and a vacuum pump 44 disposed in the discharge path 42.

The transparent sheet layers 12 may be formed of a light-transmitting material. An example of such a material is a transparent resin. As long as at least one of the transparent sheet layers 12 is formed of a flexible sheet made of a transparent resin, the other sheet layer may be formed of a glass plate or a resin plate.

The transparent resin may be preferably a thermoplastic resin, such as a fluororesin, a polyvinyl chloride resin, polyester, polyethylene, an ethylene/vinyl acetate copolymer (hereinbelow, abbreviated as EVA), polyethylene terephthalate, an acrylic resin, and polycarbonate. The transparent resin is more preferably a fluororesin in terms of transparency, mechanical strength, weatherability, resistance to UV light, heat resistance, melt-bonding property etc.

Examples of the fluororesin include an ethylene/tetrafluoroethylene copolymer (hereinbelow, abbreviated as ETFE), a hexafluoropropylene/tetrafluoroethylene copolymer (hereinbelow, abbreviated as FEP), a perfluoro(alkyl vinyl ether)/tetrafluoroethylene copolymer, a tetrafluoroethylene/hexafluoropropylene/vinylidene fluoride copolymer (hereinbelow, abbreviated as THV), polyvinylidene fluoride, a vinylidene fluoride/hexafluoropropylene copolymer, and polyvinyl fluoride. The fluororesin is more preferably ETFE, FEP or THV, particularly preferably ETFE, in terms of transparency, mechanical strength, heat resistance, etc.

The transparent resin may contain, e.g. a known additive to such a degree that the object of the present invention is not damaged.

Each of the transparent sheet layers 12 may be a sheet having a single layer or a sheet having laminated layers. The sheet having laminated layers may be a sheet having three layers wherein a polyethylene layer, an EVA layer and a polyethylene layer are laminated in this order.

The transparent sheet layers 12 may be subjected to surface treatment. Examples of the surface treatment include a hydrophilic treatment, a stain-repellent treatment and a water-repellent treatment.

Examples of the method for carrying out the hydrophilic treatment include a method for applying a hydrophilizing agent (such as an inorganic colloid, a hydrophilic resin and a metal oxide) to the surface of a transparent sheet layer 12, and a method for sputtering a metal oxide (such as a silicon oxide, a tin oxide and a titanium oxide) on the surface of a transparent sheet layer 12.

Both of the surfaces of the transparent sheet layers 12 that are opposed to each other inside the multiple sheet 10 (in other words, the opposed surfaces of the transparent sheet layers 12) may be subjected to a surface treatment. Only one of the opposed surfaces may be subjected to a surface treatment. Neither of the opposed surfaces may be subjected to a surface treatment.

When each of the transparent sheet layers 12 is formed of a transparent resin, the transparent sheet layers have a thickness of preferably at most 800 μm, more preferably at most 700 μm in terms of transparency, processability etc. The thickness is preferably at least 20 μm, more preferably at least 40 μm in terms of mechanical strength etc.

When each of the transparent sheet layers 12 is formed of glass, the transparent sheet layers have a thickness of preferably from 3 mm to 10 mm.

Each of the transparent sheet layers has a total light transmittance of preferably at least 80%, more preferably at least 85%, most preferably at least 90%. When each of the transparent sheet layers has a total light transmittance of at least 70%, it is easy to ensure an amount of light required for plant photosynthesis. There is no upper limit to the total light transmittance of the transparent sheet layers 12.

The total light transmittance of the transparent sheet layers may be measured in conformity with the regulation of JIS (Japanese Industrial Standard) K7361-1.

The total light transmittance of the multiple sheet 10 is set at preferably at least 80%, more preferably at least 85%, particularly preferably at least 90% in order to increase the amount of light passing through the multiple sheet. On the other hand, the total light transmittance of the multiple sheet may be set at from 50 to 80% in order to decrease the amount of light passing through the multiple sheet.

Since the light control system 1 described above includes the vapor supply system 30 for supplying vapor in between the transparent sheet layers 20 of the multiple sheet 10, it is possible to generate dew condensation on the opposed surfaces of the transparent sheet layers 12 in order to reduce the amount of light passing though the multiple sheet 10 in comparison with the amount of light passing through the multiple sheet before supplying vapor in between the transparent sheet layers 12.

Further, since the light control system includes the pressure-reducing system 40 for reducing the pressure between the transparent sheet layers 12 of the multiple sheet 10, it is possible to reduce the pressure between the transparent sheet layers 12 of the multiple sheet 10 and bring the transparent sheet layers 12 into close contact with each other with vapor-deriving moisture existing between the transparent sheet layers 12, whereby the amount of light passing through the multiple sheet 10 can be increased in a short period of time to at least the level that was obtained before supplying the vapor in between the transparent sheet layers 12.

It is sufficient that the light control system according to the present invention includes a multiple sheet formed of a plurality of opposed transparent sheet layers, a moisture supply system for supplying moisture in between the transparent sheet layers of the multiple sheet, and a pressure-reducing system for reducing the pressure between the transparent sheet layers of the multiple sheet. The light control system according to the present invention is not limited to the light control system 1 shown in FIG. 1.

Figure 2:
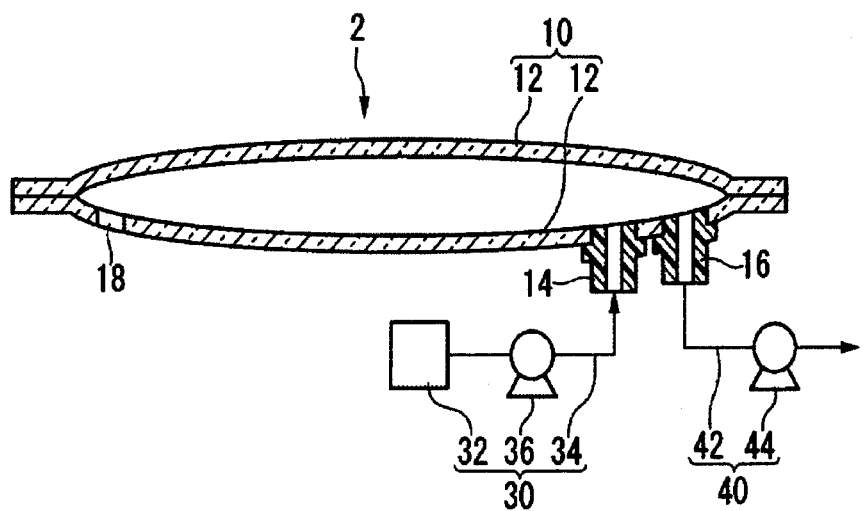
FIG. 2 is a cross-sectional view of the light control system according to another embodiment of the present invention.

For example, the multiple sheet 10 may be formed in a bag-like structure obtainable by heat-sealing peripheral edge portions of two transparent sheet layers 12 as shown in the light control system 2 shown in FIG. 2 without disposing a frame at the peripheral edge portions of the two transparent sheet layers 12. Such a bag-like multiple sheet may be a multiple sheet obtainable by folding a single transparent sheet in half and heat-sealing three sides to form two transparent sheet layers, or a multiple sheet obtainable by heat-sealing both end openings of a cylindrical form of transparent sheet to form two transparent sheet layers.

The gas inlet port and the discharge port may be combined as a single gas supply and discharge port such that the moisture supply system and the pressure-reducing system are switchably connected to the gas supply and discharge port.

The multiple sheet may be configured such that a plurality of multiple sheets are disposed side by side in communication with adjacent multiple sheets through communication members (such as communication pipes and communication slits), at least one of the multiple sheets has a gas supply port formed therein so as to be connected to a moisture supply system, and at least one of the multiple sheets has an discharge port formed therein so as to be connected to a pressure-reducing system.

The number of the transparent sheet layers is not limited to one. The number may be set to at least three. The number is preferably from two to five, more preferably from two to three, in terms of light transmittance, costs etc.

The moisture supply system is not limited to the vapor supply system 30 shown in FIG. 1. The moisture supply system may be a mist supply system including a mist generator, a gas supply path and a blower or a running water supply system including a water tank and a liquid delivery pump. The provision of such a mist supply system can generate dew condensation on the opposed surfaces of the transparent sheet layers 12 to reduce the amount of light passing through the multiple sheet 10 as in the case of the provision of the vapor supply system 30 in comparison with the amount of light passing through the multiple sheet before supplying a mist in between the transparent sheet layers 12. On the other hand, the provision of such a running water supply system is difficult to sufficiently reduce the amount of light passing through the multiple sheet 10 unlike the case of the provision of the mist supply system in comparison with the amount of light passing through the multiple sheet before supplying running water in between the transparent sheet layers 12.

Light Control Process

The light control process according to the present invention includes the following steps (a) to (c):

(a) a step for supplying moisture in between the transparent sheet layers of a multiple sheet, which are formed of a plurality of opposed transparent sheet layers (b) a step for after the step in item (a), reducing the pressure between the transparent sheet layers of the multiple sheet to bring the transparent sheet layers into close contact with each other with the moisture existing between the transparent sheet layers, whereby the amount of light passing through the multiple sheet is increased in comparison with the amount of light passing through the multiple sheet before supplying the moisture in between the transparent sheet layers (c) a step for after the step in item (b), as required, forming a gas layer between the transparent sheet layers to return the amount of light passing through the multiple sheet, to the level that was obtained before supplying the moisture in between the transparent sheet layers Step in Item (a)

In a normal state, the multiple sheet has a gas layer formed between the transparent sheet layers for heat insulation or another purpose. When the multiple sheet has the two transparent sheet layers 12 held in parallel with a gap by the frame 20 as shown in FIG. 1, the gas layer is formed between the transparent sheet layers 12 without increasing the pressure between the transparent sheet layers 12. On the other hand, when the multiple sheet is formed in a bag-like structure as shown in FIG. 2, the gas layer is formed between the transparent sheet layers 12 by increasing the pressure between the transparent sheet layers 12 by use of the blower 36.

When moisture is supplied in between the transparent sheet layers with a gas layer being formed between the transparent sheet layers, at least one of the surfaces of the transparent sheet layers that are opposed to each other on the inner sides of the multiple sheet (i.e. the opposed surfaces of the transparent sheet layers) is wet with moisture.

It is sufficient that the moisture can wet at least one of the surfaces of the transparent sheet layers. Examples of the moisture include water (running water), vapor and a mist. When vapor and/or a mist is supplied as the moisture, it is expected to obtain a light-blocking effect or a heat-shielding effect for the following reasons:

When vapor and/or a mist is supplied as the moisture, dew condensation is generated on at least one of the opposed surfaces of the transparent sheet layers. Since such vapor and/or a mist is supplied as a gas containing the same, the gas between the transparent sheet layers is discharged from the discharge port formed in a transparent sheet layer at the same time as such a gas containing vapor and/or a mist is supplied.

The dew condensation generated on at least one of the opposed surfaces of the transparent sheet layers exhibits a light-blocking effect because of reflecting and scattering light. Thus, it is possible to reduce the amount of light passing through the multiple sheet in comparison with the amount of light passing through the multiple sheet before supplying the vapor and/or a mist in between the transparent sheet layers. Further, the dew condensation generated on at least one of the opposed surfaces of the transparent sheet layers also exhibits a heat-shielding effect because of absorbing infrared rays. On the other hand, when running water is supplied as the moisture, there is little expectation that a light-blocking effect is obtained.

Step in Item (b)

The pressure between the transparent sheet layers of the multiple sheet is reduced with at least one of the opposed surfaces of the transparent sheet layers being wet with moisture. Thus, the transparent sheet layers are brought into close contact with each other with moisture existing between the transparent sheet layers. When the transparent sheet layers are brought into close contact with each other with moisture existing between the transparent sheet layers, the transparent sheet layers are apparently unified as a single sheet with no gas existing between the transparent sheet layers. Thus, it is possible to have a higher light transmittance than a case where a gas layer is formed between the transparent sheet layers or where the transparent sheet layers are brought into close contact with each other with no moisture existing between the transparent sheet layers. In this way, the amount of light passing through the multiple sheet is increased in comparison with the amount of light passing through the multiple sheet before supplying the moisture in between the transparent sheet layers.

Step in Item (c)

When the multiple sheet has the two transparent sheet layers 12 held in parallel with a gap by the frame 20 as shown in FIG. 1, a gas layer is formed between the transparent sheet layers 12 by stopping the pressure-reducing system 40 and increasing the pressure between the transparent sheet layers 12 by use of the blower 36 as required. When the multiple sheet is formed in a bag-like structure as shown in FIG. 2, a gas layer is formed between the transparent sheet layers 12 by stopping the pressure-reducing system 40, followed by increasing the pressure between the transparent sheet layers 12 by use of the blower 36. The moisture that has existed between the transparent sheet layers is discharged through the gas supply port, the discharge port or a water-permeable sheet (one disclosed in, e.g. JP-A-2005-204650). The formation of such a gas layer between the transparent sheet layers 12 can return the amount of light passing through the multiple sheet, to the level that was obtained before supplying the moisture in between the transparent sheet layers.

In the light control process according to the present invention described above, moisture is supplied in between the transparent sheet layers of the multiple sheet, followed by reducing the pressure between the transparent sheet layers of the multiple sheet to bring the transparent sheet layers into close contact with each other with the moisture existing between the transparent sheet layers. Thus, it is possible to increase the amount of light passing through the multiple sheet, in a short period of time, to at least the level that was obtained before supplying the moisture in between the transparent sheet layer.

Specific Embodiment of Light Control Process

Now, a light control process employing the light control system 1 will be specifically described.

The light control process employing the light control system 1 includes the following steps (a1) to (c1):

(a1) a step for supplying vapor and/or a mist in between the transparent sheet layers 12 of the multiple sheet 10 to generate dew condensation on the opposed surfaces of the transparent sheet layers 12, whereby the amount of light passing through the multiple sheet 10 is reduced in comparison with the amount of light passing through the multiple sheet before supplying the vapor and/or a mist in between the transparent sheet layers 12

(b1) a step for after the step in item (a1), reducing the pressure between the transparent sheet layers 12 of the multiple sheet 10 to bring the transparent sheet layers 12 into close contact with each other with vapor and/or mist-deriving moisture existing between the transparent sheet layers 12, whereby the amount of light passing through the multiple sheet 10 is increased in comparison with the amount of light passing through the multiple sheet before supplying the vapor and/or mist in the transparent sheet layers 12

(c1) a step for after the step in item (b1), as required, forming a gas layer between the transparent sheet layers to return the amount of light passing through the multiple sheet, to the level that was obtained before supplying the vapor in between the transparent sheet layers.

Step (a1)

In a normal state, the multiple sheet has a gas layer formed between the transparent sheet layers 12 for thermal insulation or another purpose.

When the vapor generator 32 and the blower 36 are activated with a gas layer being formed between the transparent sheet layers 12, and when a gas, which contains vapor (and a mist formed by partial condensation of the vapor) generated from the vapor generator 32, is supplied in between the transparent sheet layers 12 of the multiple sheet 10 from the gas supply port 14 via the gas supply path 34, the gas between the transparent sheet layers 12 is discharged through the second discharge port 18, and then the space between the transparent sheet layers 12 is filled with such a gas containing the vapor to generate dew condensation on at least one of the opposed surfaces of the transparent sheet layers 12. The dew condensation generated on at least one of the opposed surface of the transparent sheet layers 12 exhibits a light-blocking effect because of reflecting or scattering light. Thus, it is possible to reduce the amount of light passing through the multiple sheet 10 in comparison with the amount of light passing through the multiple sheet before supplying the vapor in between the transparent sheet layers 12. Further, the dew condensation generated on at least one of the opposed surfaces of the transparent sheet layers 12 exhibits a heat-shielding effect because of absorbing infrared rays.

Step (b1)

The vapor generator 32 and the blower 36 are stopped with the dew condensation being generated on at least one of the opposed surfaces of the transparent sheet layers 12, followed by activating the pressure-reducing system 40 to discharge the gas between the transparent sheet layers 12 through the first discharge port 16 so as to reduce the pressure between the transparent sheet layers 12. Thus, the transparent sheet layers 12 are brought into close contact with each other with moisture existing between the transparent sheet layers 12, whereby the amount of light passing through the multiple sheet 10 is increased in comparison with the amount of light passing through the multiple sheet before supplying the vapor in between the transparent sheet layers 12.

Step (c1)

When the pressure-reducing system 40 is stopped, a gas layer is formed between the transparent sheet layers 12 without increasing the pressure between the transparent sheet layers 12. The moisture that existed between the transparent sheet layers 12 is discharged through the gas supply port 14, the first discharge port 16 or the second discharge port 18, or a water-permeable sheet disposed as required. The formation of such a gas layer between the transparent sheet layers 12 allows the amount of light passing through the multiple sheet 10, to return to the level that was obtained before supplying the vapor in between the transparent sheet layers 12.

In the light control process employing the light control system 1 described above, since vapor is supplied in between the transparent sheet layers 12 of the multiple sheet 10 to generate dew condensation on at least one of the opposed surfaces of the transparent sheet layers 12, it is possible to reduce the amount of light passing through the multiple sheet 10 in comparison with the amount of light passing through the multiple sheet before supplying the vapor in between the transparent sheet layers 12.

Further, since the pressure between the transparent sheet layers 12 of the multiple sheet 10 is reduced to bring the transparent sheet layers 12 into close contact with each other with vapor-deriving moisture existing between the transparent sheet layers 12, it is possible to increase the amount of light passing through the multiple sheet 10, to the level that was obtained before supplying the vapor in between the transparent sheet layers 12.

Building

The building according to the present invention is a building, which includes the light control system according to the present invention and has a roof and/or walls at least partly formed of a multiple sheet.

Examples of the building include a house for cultivating plants (such as an agricultural greenhouse and a greenhouse for gardening), a barn (such as a cowhouse, a pig farm and a chicken farm), a facility for fish farming, and a sport facility (such as a gymnasium, a swimming pool, a tennis court, a soccer stadium and a baseball park). Among them, the building according to the present invention is most appropriate to be used in a house for cultivating plants, where it is particularly important to control the indoor environment, such as light and temperature.

Figure 3:
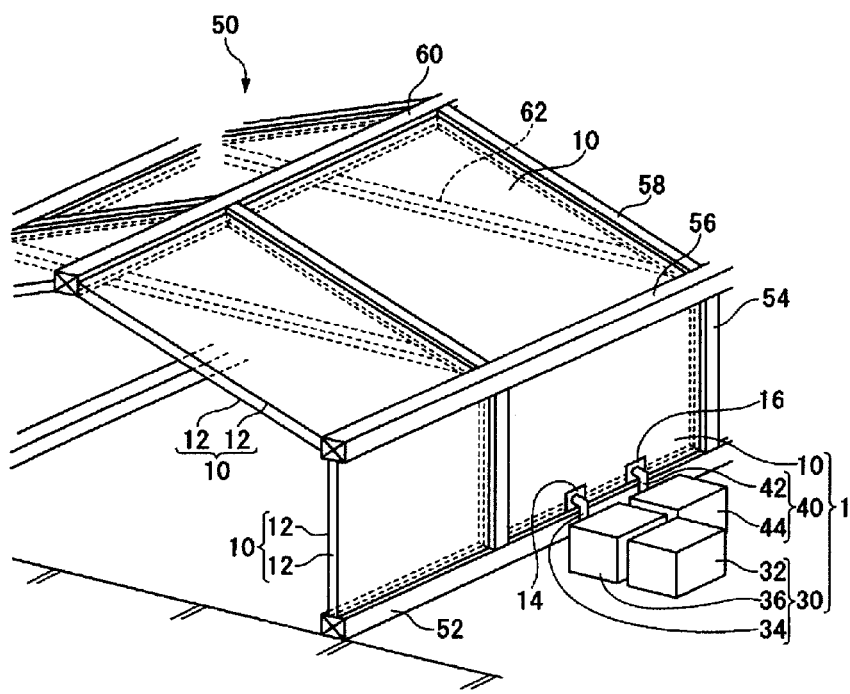
FIG. 3 is a perspective cross-sectional view showing the building according to an embodiment of the present invention.

FIG. 3 is a perspective and cross-sectional view showing an agricultural greenhouse. The agricultural greenhouse 50 includes the above-mentioned light control system 1 and has a roof and walls formed of multiple sheets 10 forming the light control system 1. The agricultural greenhouse 50 includes a foundation 52, poles 54, beams 56, rafters 58, a ridgepole 60, joists 62 and other members; and frame members (not shown) integrally mounted to the foundation 52, the poles 54, the beams 56, the rafters 58, the ridgepole 60 and the other members, which form the framework of the agricultural greenhouse 50; the multiple sheets 10, each of which is formed of two transparent sheet layers 12 having a peripheral edge airtightly held to a frame member; the vapor supply system 30 for supplying vapor in between the transparent sheet layers 12 of the respective multiple sheets 10 (moisture supply system); and the pressure-reducing system 40 for decreasing the pressure between the transparent sheet layers 12 of the respective multiple sheets 10.

The vapor supply system 30 includes a vapor generator 32, a supply path 34 connecting between the vapor generator 32 and a gas supply port 14 of a multiple sheet 10, and a blower 36 disposed in the gas supply path 34.

The pressure-reducing system 40 includes a discharge path 42 having one end connected to a first discharge port 16 of the multiple sheet 10, and a vacuum pump 44 disposed in the discharge path 42.

Examples of the framework of the agricultural greenhouse 50, such as a foundation 52, poles 54, beams 56, rafters 58, a ridgepole 60 and joists 62, include metal pipes and shaped members of metal (such as angle joints and poles having a square section). These are coupled by clamps (such as orthogonal clamps and universal clamps).

It is preferred that the poles 54, the beams 56, the rafters 58, the ridgepole 60 and so on, which exist between adjacent multiple sheets, include communication systems, such as communication pipes and communication slits (not shown), which provides communication between the inner spaces of the adjacent multiple sheets 10. By providing communication between the inner space of the adjacent multiple sheets 10, it is possible to minimize the number of the supply ports 14, the first discharge ports 16 and the second discharge ports (not shown) formed in the transparent sheet layers 12, and the number of the vapor supply systems 30 and the pressure-reducing systems 40.

The light control process in the agricultural greenhouse 50 may be carried out in the same way as the light control process employing the above-mentioned light control system 1.

In the agricultural greenhouse 50 described above, it is possible to generate dew condensation on the opposed surfaces of the transparent sheet layers 12 to reduce the amount of light passing through the multiple sheets 10 in comparison with the amount of light passing through the multiple sheets before supplying vapor in between the transparent sheet layers 12 since the vapor supply system(s) 30 is disposed to supply the vapor in between the transparent sheet layers 12 of the multiple sheets 10 forming the roof and the walls. Thus, it is possible to reduce the amount of light entering the agricultural greenhouse 50.

Since the pressure-reducing system 40 is disposed to reduce the pressure between the transparent sheet layers 12 of each multiple sheet 10, the pressure between the transparent sheet layer 12 of each multiple sheet 10 is reduced to bring the sheet layers 12 into close contact with each other with vapor-deriving moisture existing between the transparent sheet layers 12, whereby it is possible to increase, in a short period of time, the amount of light passing through that multiple sheet 10 to the level that was obtained by supplying the vapor in between the transparent sheet layers 12. Thus, it is possible to increase, in a short period of time, the amount of light entering the agricultural greenhouse 50.

It is sufficient that the building according to the present invention is a building including the light control system according to the present invention, which has the roof and/or the walls at least partly formed of a multiple sheet with the light control system according to the present invention is applied thereto. The building according to the present invention is not limited to the agricultural greenhouse 50 shown in FIG. 3.

Figure 4:
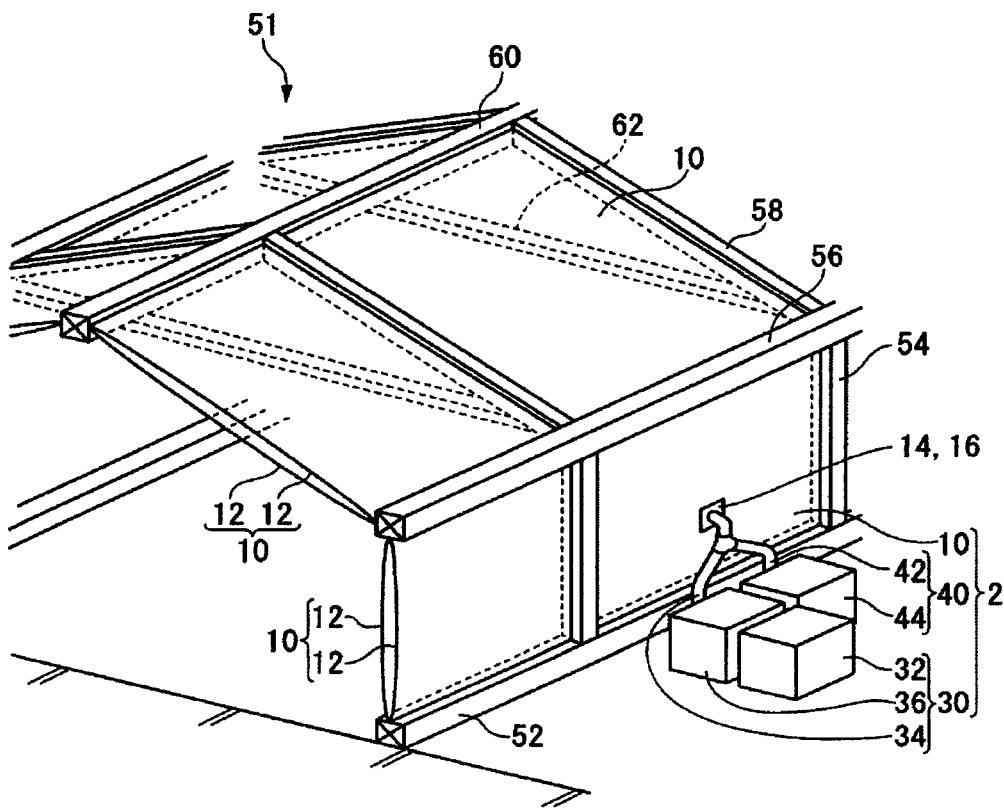
FIG. 4 is a perspective cross-sectional view showing the building according to another embodiment of the present invention.

For example, the building according to the present invention may be one that includes the above-mentioned light control system 2, instead of the light control system 1, as in the agricultural greenhouse 51 shown in FIG. 4.

As shown in FIG. 4, the supply port 14 and the first discharge port 14 may be combined as a single supply and discharge port, which is switchably connected to the vapor supply system 30 and the pressure-reducing system 40.

The roof of the building may be formed in a semicircular shape in section. The agricultural greenhouse may be formed in a semicircular shape in section having its roof and walls unified.

EXAMPLES

Now, the present invention will be described in more detail, referring to examples. It should be noted that the present invention is not limited to the examples.

Total Light Transmittance

The total light transmittance of the transparent sheet layers used in the examples were measured in conformity with JIS K7361-1.

Comparison Ratio in Illuminance

The comparison ratios were found according to the following formula, based on illuminance X measured on the light source side of the respective multiple films and illuminance Y measured on the opposite side of the respective multiple films remote from the light source.

$$\text{Comparison Ratio (\%)} = Y/X \times 100$$

Example 1

The measurements in Examples 1 to 3 were performed in a room, which had a temperature of 25° C. and a relative humidity (hereinbelow, abbreviated as RH) of 33% and was configured so as to prevent outside light from entering thereinto.

An ETFE film (A), which had one surface subjected to a hydrophilic treatment ("F-CLEAN 100 WT" manufactured by Asahi Glass Company, Limited, having a thickness of 100 µm, a length of 1,250 mm and a width of 1,250 mm and having a total light transmittance of from 93 to 94%), and an ETFE film (B), which had not been subjected to a hydrophilic treatment ("F-CLEAN 100 NT" manufactured by Asahi Glass Company, Limited, having a thickness of 100 µm, a length of 1,250 mm and a width of 1,250 mm and having a total light transmittance of from 93 to 94%), were prepared.

The hydrophilic treatment was carried out by a method for applying a hydrophilizing agent (metal oxide type).

A single gas supply and discharge port (C) was formed at a position of the ETFE film (A) in the vicinity of a substantially center in the width direction and in the vicinity of a lower end in the length direction, and a single discharge port (D) was formed at a position of the ETFE film (A) in the vicinity of the substantially center in the width direction and in the vicinity of an upper end in the length direction.

The ETFE film (A) and the ETFE film (B) were superposed such that the hydrophilic treated surface of the ETFE film (A) faces inward, and the peripheral edge portions of both films were airtightly held by a frame formed of a receiving member and a retaining member (having a length of 1,150 mm and a width of 1,150 mm), fabricating a multiple film.

A light source lamp ("Reflective Sun Lamp DR400/T(L)" manufactured by Toshiba Lighting & Technology Corporation) was placed on a side of the multiple film with the ETFE film (A) located therein. A light meter (spectroradiometer in the name of "MS-720" manufactured by EKO Instruments Co., Ltd.) was placed on a side of the multiple film with the ETFE film (B) located therein. The light source lamp and the light meter were placed such that a straight line connecting between the light-emitting part of the light source lamp and the sensor of the light meter extended orthogonally to the surfaces of the multiple sheet and passed through the center of the multiple sheet. The light source lamp was placed to have the light-emitting part apart from the multiple film by a distance of 450 mm while the light meter was placed to have the sensor apart from the multiple film by a distance of 320 mm.

Figure 5:
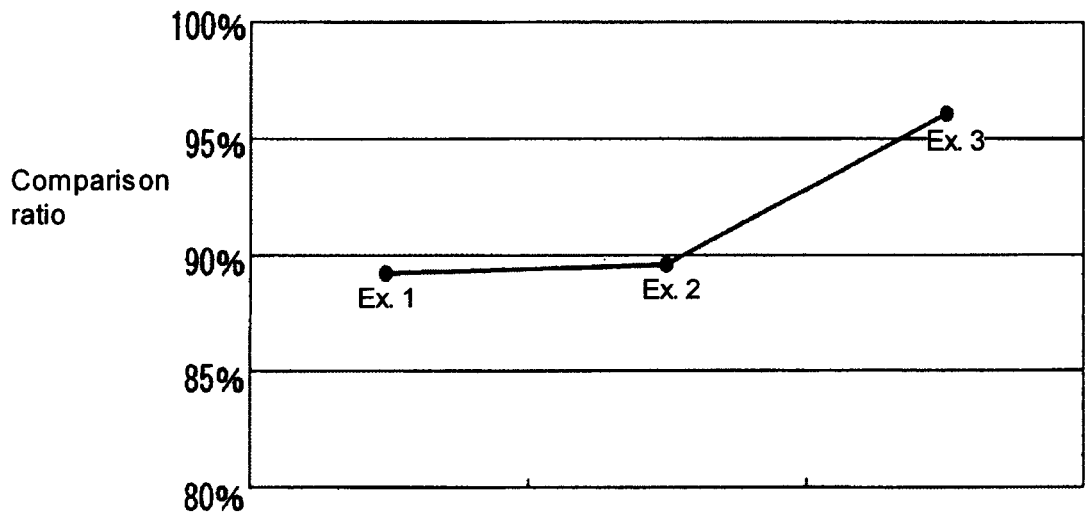
FIG. 5 is a graph showing the rates revealed by illuminance comparison in Examples 1 to 3.

Comparison ratios were found by measuring illuminance on both sides of the multiple sheet close to and remote from the light source with the ETFE film (A) and the ETFE film (B) being simply superposed. The measurement results are shown in FIG. 5.

Example 2

Next, the gas supply and discharge port (C) was connected to one end of a tube (made of a vinyl chloride resin and having an inner diameter of 25 mm), and the other end of the tube was connected to a vacuum cleaner ("NC-103", 100 V, 1,050 W, manufactured by NICLON KOGYO KABUSHIKI KAISHA).

The vacuum cleaner was activated to reduce the pressure between the ETFE film (A) and the ETFE film (B) to bring the ETFE film (A) and the ETFE film (B) into close contact with each other.

Comparison ratios were found by measuring illuminance on both sides of the multiple sheet close to and remote from the light source with the ETFE film (A) and the ETFE film (B) being brought into close contact with each other. The measurement results are shown in FIG. 5.

Example 3

Next, the other end of the tube was switched to be connected to a blower ("ELECTRIC BLOWER" having a nozzle size of 30 mm, 50/60 Hz, 55/51 W, and manufactured by YODOGAWA ELECTRIC TOOL MFG. CO.). A water bath, which was placed on an induction-heating cooker ("MH-B1", 100 V, 1,350 W, manufactured by Hitachi, Ltd.), was put into a casing made of a transparent resin, and the casing was connected to the blower.

The blower was activated to supply air containing vapor in between the ETFE film (A) and the ETFE film (B), generating dew condensation on the inner surfaces of the multiple sheet.

Next, the other end of the tube was switched to be connected to the vacuum cleaner ("NC-103", 100 V, 1,050 W, manufactured by NICLON KOGYO KABUSHIKI KAISHA).

The vacuum cleaner was activated to reduce the pressure between the ETFE film (A) and the ETFE film (B) to bring the ETFE film (A) and the ETFE film (B) into close contact with each other with moisture existing between the ETFE film (A) and the ETFE film (B).

Comparison ratios were found by measuring illuminance on both sides of the multiple sheet close to and remote from the light source with the ETFE film (A) and the ETFE film (B) being brought into close contact with each other through a thin film of water. The measurement results are shown in FIG. 5.

As clearly seen from the results shown in FIG. 5, it was revealed that there was almost no change in the amount of light passing through the multiple sheet between a case where the ETFE film (A) and the ETFE film (B) were brought into close contact with each other in a dry state (Example 2) and a case where the ETFE film (A) and the ETFE film (B) were simply superposed (Example 1). On the other hand, it was revealed that the amount of light passing through the multiple sheet increased in a case where the ETFE film (A) and the ETFE film (B) were brought into close contact with each other through such a thin film of water (Example 3) in comparison with Examples 1 and 2.

Example 4

The illuminance measurement in Example 4 was performed outdoors on a fine day in September, 2008.

As in Example 1, a multiple film was prepared such that the peripheral edge portions of the ETFE film (A) and the ETFE film (B) were airtightly held by a frame formed of a receiving member and a retaining member. The multiple film was placed outdoors so as to have a surface facing directly to the south and slanted at an inclination angle of 45 degrees. The light meter (spectroradiometer in the name of "MS-720" manufactured by EKO Instruments Co. Ltd.) was placed on a side of the multiple film with the ETFE film (B) located therein. The light meter was placed to have the sensor apart from the multiple film by a distance of 300 mm.

The gas supply and discharge port (C) was connected the one end of the tube (made of such a vinyl chloride resin and having an inner diameter of 25 mm), and the other end of the tube was connected to the blower ("ELECTRIC BLOWER" having a nozzle size of 30 mm (50/60 Hz, 55/51 W, and manufactured by YODOGAWA ELECTRIC TOOL MFG. CO.). The water bath, which was placed on the induction-heating cooker ("MH-B1", 100 V, 1,350 W, manufactured by Hitachi, Ltd.), was put into the casing made of such a transparent resin, and the casing was connected to the blower.

Figure 6:
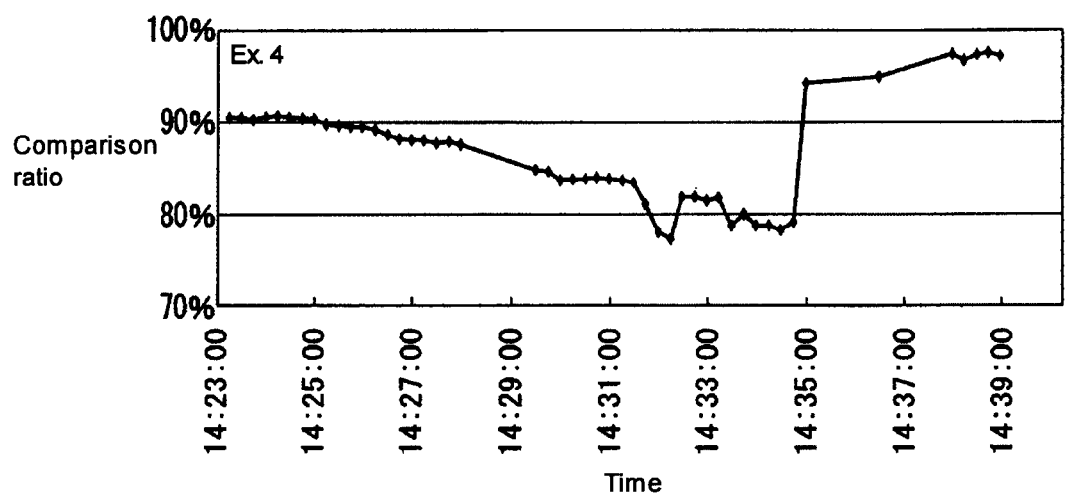
FIG. 6 is a graph showing changes in the rates revealed by illuminance comparison with respect to the lapse of time in Example 4.

The blower was activated to supply air containing vapor in between the ETFE film (A) and the ETFE film (B). Comparison ratios were found by measuring changes in illuminance with the lapse of time on both sides of the multiple sheet close to the sun and remote from the sun. The measurement results are shown in FIG. 6. It was revealed that the amount of light passing through the multiple sheet decreased as the amount of dew condensation generated on the inner surfaces of the multiple sheet increased.

After about twelve minutes passed since the commencement of supply of the air containing vapor, the other end of the tube was switched to be connected to the vacuum cleaner ("NC-103", 100 V, 1,050 W, manufactured by NICLON KOGYO KABUSHIKI KAISHA).

The vacuum cleaner was activated to reduce the pressure between the ETFE film (A) and the ETFE film (B). Comparison ratios were found by measuring changes in illuminance with the lapse of time on both sides of the multiple sheet close to and remote from the sun. The measurement results are shown in FIG. 6. Just after the commencement of pressure-reducing, the ETFE film (A) and ETFE film (B) were brought into close contact with each other through a thin film of water, increasing, in a short period of time, the amount of light passing through the multiple film. The amount of light passing through the multiple sheet at that time exceeded the level of the amount of light passing through the multiple sheet before the commencement supply of the air containing vapor.

Example 5

The measurement in Example 5 was performed in the room, which had a temperature of 25° C. and an RH of 33% and was configured so as to prevent outside light from entering thereinto.

As in Example 1, the peripheral edge portions of the ETFE film (A) and the ETFE film (B) were airtightly held by a frame formed of a receiving member and a retaining member, fabricating a multiple film.

A light source lamp ("National High-lamp 300 W type" manufactured by Matsushita Electric Industrial Co., Ltd.) was placed on a side the multiple film with the ETFE film (A) located therein. A light meter ("ANA-F11 general A class light meter" manufactured by TOKYO PHOTO ELECTRIC CO., LTD.) was placed on a side the multiple film with the ETFE film (B) located therein. The light source lamp and the light meter were placed such that a straight line connecting between the light-emitting part of the light source lamp and the sensor of the light meter extended orthogonally to the surfaces of the multiple sheet and passed through the center of the multiple sheet. The light source lamp was placed to have the light-emitting part apart from the multiple film by a distance of 450 mm while the light meter was placed to have the sensor apart from the multiple film by a distance of 320 mm.

The gas supply and discharge port (C) was connected to one end of the tube (made of such a vinyl chloride resin and having an inner diameter of 25 mm, and the other end of the tube was connected to the blower ("ELECTRIC BLOWER" having a nozzle size 30 mm, 50/60 Hz, 55/51 W) and manufactured by YODOGAWA ELECTRIC TOOL MFG. CO.). The water bath, which was placed on the induction-heating cooker ("MH-B1", 100 V, 1,350 W, manufactured by Hitachi, Ltd.), was put into the casing made of such a transparent resin, and the casing was connected to the blower. Then, the connection to the vacuum cleaner ("NC-103", 100 V, 1,050 W, manufactured by NICLON KOGYO KABUSHIKI KAISHA) was made.

The blower was activated to supply air containing vapor in between the ETFE film (A) and the ETFE film (B), generating dew condensation of the inner surfaces of the multiple sheet. Changes in illuminance with the lapse of time were measured on a side of the multiple film remote from the light source.

After four minutes passed since the commencement of supply of the air containing vapor, the air containing vapor was switched to the air in the room, and changes in illuminance with the lapse of time were measured on the side of the multiple film remote from the light source. It was revealed that although the dew condensation on the inner surfaces of the multiple sheet was gradually removed, it took about 20 minutes after switching to the air in the room until the illuminance was returned to the level that obtained before supplying the air containing vapor.

INDUSTRIAL APPLICABILITY

The light control system and the light control process, to which the present invention is applied, are effective to buildings, which have a roof or walls formed of transparent sheet layers or transparent films, such as houses for cultivating plants where indoor environment, such as temperature, is important.

The entire disclosure of Japanese Patent Application No. 2008-264753 filed on Oct. 14, 2008 including specification, claims, drawings and summary is incorporated herein by reference in its entirety.

REFERENCE SYMBOLS

1 Light control system
2 Light control system
10 Multiple sheet
12 Transparent sheet layer
30 Vapor supply system (moisture supply system)
40 Pressure-reducing system
50 Agricultural greenhouse
51 Agricultural greenhouse

What is claimed is:

1. A light control process for controlling an amount of light passing through a multiple sheet, comprising a plurality of opposed transparent sheet layers, the light control process comprising:
   (a) reducing the amount of light passing through the multiple sheet from an initial level to a reduced level by supplying moisture to a gas supply port and into a space between transparent sheet layers forming the multiple sheet while discharging gas from a discharge port located at a position opposite to the supply port;
   (b) after conducting the step (a), increasing the amount of light passing through the multiple sheet from said reduced level to at least said initial level by reducing pressure in the space between the transparent sheet layers of the multiple sheet such that the transparent sheet layers are brought into close contact with each other with the moisture existing between the transparent sheet layers, wherein said increasing the amount of light is performed in a shorter time period than a time period of said reducing the amount of light; and
   (c) after conducting the step (b), discharging the moisture existing between the transparent sheet layers of the multiple sheet through either the gas supply port or another discharge port.

2. The process according to claim 1, wherein at least one of the transparent sheet layers comprises a material selected from the group consisting of a fluororesin, a polyvinyl chloride resin, polyester, polyethylene, an ethylene/vinyl acetate copolymer, polyethylene terephthalate, an acrylic resin, and polycarbonate.

3. The process according to claim 2, wherein the fluororesin comprises a fluororesin selected from the group consisting of an ethylene/tetrafluoroethylene copolymer, a hexafluoropropylene/tetrafluoroethylene copolymer, a perfluoro(alkyl vinyl ether)/tetrafluoroethylene copolymer, a tetrafluoroethylene/hexafluoropropylene/vinylidene fluoride copolymer, polyvinylidene fluoride, a vinylidene fluoride/hexafluoropropylene copolymer, and polyvinyl fluoride.

4. The process according to claim 1, wherein each of the transparent sheet layers has a total light transmittance of at least 80%.

5. The process according to claim 1, wherein the supplying comprises supplying at least one of vapor and a mist in the space between the transparent sheet layers of the multiple sheet such that dew condensation is generated on the opposed surfaces of the transparent sheet layers, and the reducing comprises reducing the pressure in the space between the transparent sheet layers of the multiple sheet such that the transparent sheet layers are brought into close contact with each other with at least one of the vapor-deriving moisture and the mist-deriving moisture existing between the transparent sheet layers.

6. The process according to claim 1, wherein the multiple sheet forms at least one of a roof and a wall in a building.

7. The process according to claim 1, wherein one of the transparent sheet layers comprises one of a glass plate and a resin plate, and the other one of the transparent sheet layers comprises a material selected from the group consisting of a fluororesin, a polyvinyl chloride resin, polyester, polyethylene, an ethylene/vinyl acetate copolymer, polyethylene terephthalate, an acrylic resin, and polycarbonate.

* * * * *